United States Patent Office 3,366,758
Patented Jan. 30, 1968

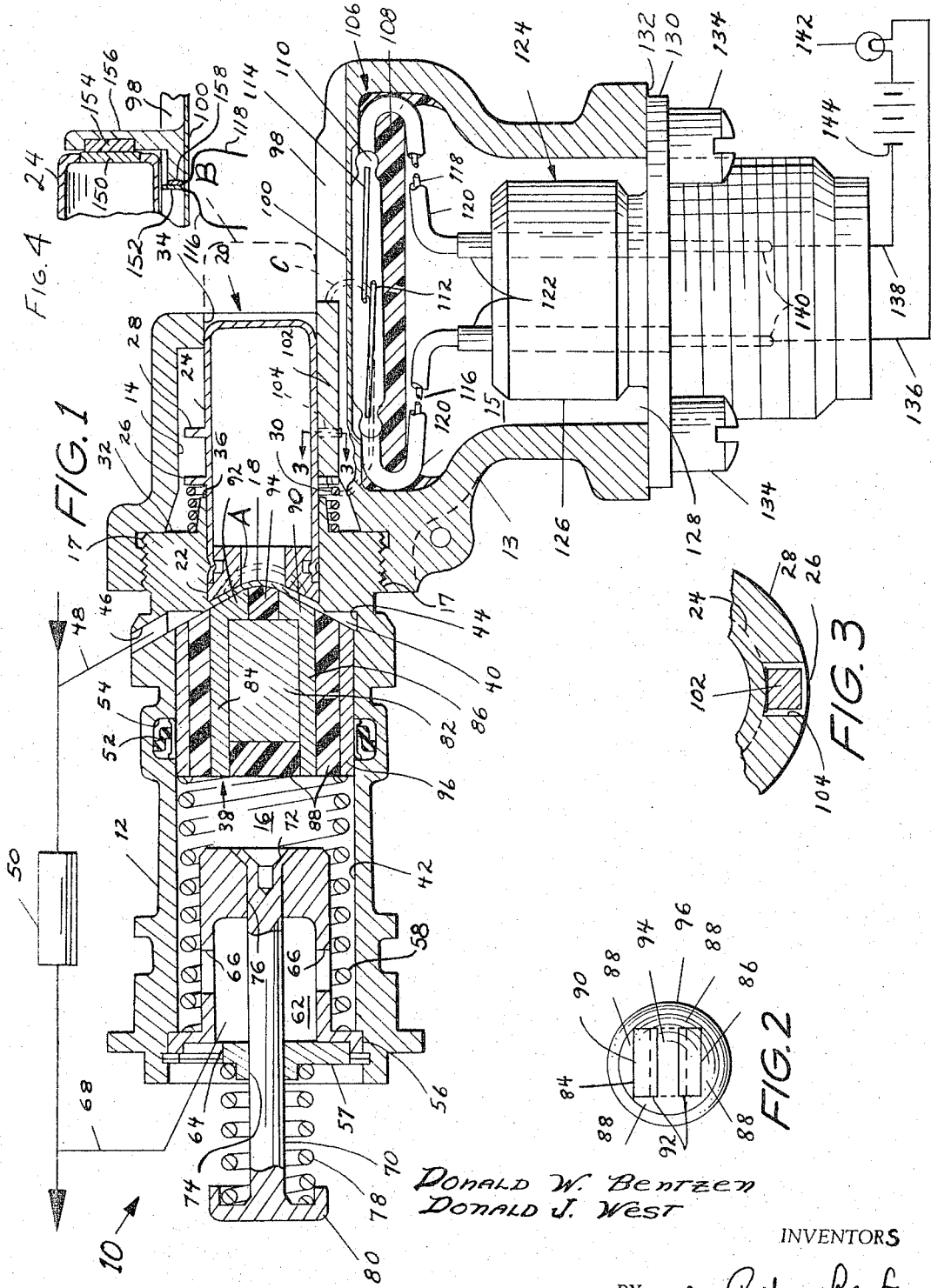

3,366,758
DIFFERENTIAL PRESSURE SIGNAL DEVICE
Donald W. Bentzen, Grosse Pointe, and Donald J. West, Warren, Mich., assignors to Holley Carburetor Company, Warren, Mich., a corporation of Michigan
Filed May 18, 1965, Ser. No. 456,795
7 Claims. (Cl. 200—82)

ABSTRACT OF THE DISCLOSURE

A magnetic pressure indicating device which will provide a visual and a suitable electrical signal when a predetermined pressure differential is attained, the signal being maintained despite G loading tending to temporarily cancel the signal, the device in its preferred form including a body having three chambers formed therein, a magnetic piston assembly to which a pressure is communicated forming a movable wall between the first chamber and the second sealed chamber, a dome-shaped fixed wall between the second and third chambers, an armature assembly slidably mounted in the third chamber and urged away from the dome-shaped wall by a spring, the armature assembly being retained against the fixed wall by the magnetic piston assembly until the piston assembly is moved away from the wall by a predetermined pressure, and an electrical switch operable by the armature assembly when it moves away from the fixed wall.

---

This invention relates generally to differential pressure indicators, and more particularly to an improved magnetic device for indicating the existence of a pressure differential exceeding a predetermined value.

In hydraulic systems wherein fluid passes through a filter, for example, it is desirable to provide means for indicating when the filter has become loaded with foreign matter. In the case of aircraft applications, the device should be a small, light-weight, foolproof unit that will not give a false indication in response to G forces. In many cases, it is desirable that the device continue to indicate a loaded filter until the condition of the filter is investigated.

Since the pressure drop across a filter increases in proportion to the accumulation of foreign matter, a suitable indication of the clogged condition may be provided by a device which is actuated in response to a predetermined pressure differential across the filter element. Such devices are known, the object of this invention being to provide certain improvements over the visual signal device shown by U.S. application, Ser. No. 375,219, filed on June 15, 1964 in the names of Leonard W. Keil and Carl F. Schorn, and assigned to the same assignee as is this invention.

A more specific object of this invention is to provide such a device which will provide a suitable electrical signal when a predetermined pressure differential is attained and maintain said signal throughout loads of up to 30 G's tending to temporarily cancel the signal.

These and other objects and advantages of the invention will become more apparent when reference is made to the following specification and the accompanying drawings wherein:

FIGURE 1 is a longitudinal cross-sectional view of an indicator device embodying the invention, the device being associated with a schematically illustrated filter element;

FIGURE 2 is an end view of the magnet assembly shown by FIGURE 1;

FIGURE 3 is an enlarged fragmentary cross-sectional view taken along the plane of line 3—3 of FIGURE 1 and looking in the direction of the arrows;

FIGURE 4 is a fragmentary cross-sectional view of a modification of a portion of the FIGURE 1 structure.

Before discussing the drawings in detail, it should be understood that with the exception of the magnet assembly, one end of which is shown by FIGURE 2, the devices shown are of a cylindrical construction. Thus, the longitudinal cross-sectional view shown by FIGURE 1 is adequate for a complete disclosure.

With the above general description in mind, FIGURE 1 illustrates a device 10 comprising a pair of aluminum or other non-magnetic bodies 12 and 13 having three cylindrical chambers 14, 15 and 16 formed therein. The bodies 12 and 13 may be formed by casting, if desired, and machined to include mating threads 17. A relatively thin dome-shaped wall 18 separates the chambers 14 and 16, the purpose of the shape of the wall to be described later.

The chamber 14 adjacent the convex side of the wall 18 houses a signal button assembly 20, which includes a ferro-magnetic, corrosion resistant armature 22 fixedly secured to a hollow signal button 24, the latter having a pair of external flanges 26 and 28 formed thereon. A resilient means, such as a coil spring 30, located between the flange 26 and a wall 32 of the chamber 14, urges the button 24 away from the dome-shaped wall 18 and through an opening 34 formed in an end of the body 13. The spring and button may be guided by an annular flange 36.

A magnetic piston assembly 38 positioned on the concave side of the wall 18 serves as a pressure responsive movable wall dividing the chamber 16 into two chambers 40 and 42, chamber 40 being normally completely occupied by the piston assembly 38 because of its engagement with the wall 18. An annulus 44 is formed around the chamber 40 to communicate therewith, and an inlet opening 46 communicates between the annulus 44 and a conduit 48 leading to a source of high pressure fluid, such as the upstream side of a filter system including the filter element 50.

A seal 52 positioned in a groove 54 formed in the wall of the chamber 16 may surround the magnetic piston assembly 38 and prevent leakage between the chambers 40 and 42. In lieu of a seal 52, a controlled clearance fit around the piston assembly 38 may be provided. A ferro-magnetic element 56 and end plate 57 are secured at the chamber 42 end of the body 12, the element 56 serving as a seat for another resilient means, such as coil spring 58, which continuously urges the piston assembly 38 toward the dome-shaped wall 18. The element 56 may consist of a low remanence ferro-magnetic or other magnetically susceptible armature which extends into the chamber 42, the projection 56 serving as a stop for the piston assembly 38 and including a central chamber 62. Openings 64 and 66 are formed in the armature 56 so that a conduit 68 may communicate with the chamber 42. The conduit 68 is connected to a source of lower pressure fluid, such as the downstream side of the filter element 50.

An aluminum or other non-magnetic reset rod 70 having a flared end 72 extends through openings 74 and 76 in the end plate 57 and the element 56, respectively, the rod 70 being urged away from the magnet assembly 38 by means of a spring 78 mounted between the outer face of the end plate 57 and a flanged end 80 formed on the rod 70.

The magnetic piston assembly 38 comprises a magnet 82 having north and south pole bars 84 and 86, which are surrounded on all but the ends thereof by a suitable potting material 88. In order to provide a maximum exposed area of the pole bars 84 and 86, without providing too convenient a metallic path for the lines of magnetic force to flow through on the magnet side of the wall 18, the end 90 may be formed to include internal flanges 92, separated by a gap 94 which is also filled with potting material 88. The material 88 and the magnet 82 are enclosed by a non-magnetic sleeve 96 which is slidably mounted in the chamber 16, as previously explained. As in the case of the armature 22, the uncovered ends 90 of the pole bars 84 and 86, and a portion of the potting material are shaped to substantially conform to the concave side of the dome-shaped wall 18. By having the magnet 82 arranged with the north and south poles 84 and 86 oppositely disposed, a relatively strong magnetic circuit is readily completed, as by the field represented by lines A, resulting in a powerful attraction of the armature. The proposed magnet construction permits the use of a relatively light-weight magnet assembly which is ideal for aircraft applications wherein the device 10 would at times be subjected to extreme high dynamic loads or G forces.

Devices of this type may be subjected to relatively high pressures, 600 p.s.i. for example. The relatively small size of this unit (approximately 3½ in. over-all extended length) and the need for a good flux path to enable the small magnet to prevent false indications as a result of dynamic loading up to 30 or more G's requires a relatively thin wall 18. It can be seen that a thin flat wall would be subjected to severe flexing or bending stresses. In other words, the high pressure to the left of the wall 18 would tend to dome it out to the right, and the extent of this deformation may be sufficient to prevent a relatively small flat end magnet from holding an armature against the wall. It must be remembered that the magnet assembly 38 travels only a very short distance before the force of spring 30 is sufficient to overcome the magnetic attraction of the armature.

By originally forming the wall 18 with a dome shape, it is better able to withstand internal forces than would a flat section of the same thickness. Thus, higher differential forces may be applied with negligible effect on the normal operation of the indicator assembly and without causing permanent deformation to the indicator body. Forming the armature 22 and the magnet assembly 38 to conform to the shape of the wall not only shortens the flux path so as to obtain maximum efficiency from a small magnet, but it also increases the adjacent areas of the magnet and the armature to provide a more efficient flux circuit.

A groove 98 is formed in the housing 13 such that a thin wall 100, approximately .020″ thick, exists between the chambers 14 and 15. A small magnet 102, having approximately a 1/16″ cross section and ½″ length is fastened to the outside wall of the button 24 in any suitable manner, such as by being glued thereto with high temperature epoxy glue. A pole of the magnet 102 abuts against the flange 26 while the flange 28 includes a notch 104, better seen in FIGURE 3, into which the magnet 102 is fitted. The other end of the magnet 102 extends slightly beyond the outer end of the button 24.

A so-called reed switch assembly 106 is confined within the chamber 15 against the wall 100 by a silicon rubber potting material 108, or any other material which is high-temperature resistant and which is sufficiently resilient to permit expansion and contraction of the switch assembly 106, while retaining the assembly 106 against the wall 100. The assembly 106 may be purchased commercially from Hamlin Incorporated, Lake Mills, Wis., and may comprise an evacuated glass housing 110 which is filled with a suitable inert gas to reduce contact contamination.

Suitable blades 112 and 114 may extend through sealed openings in the ends of the glass housing 110 to a point where the inner ends thereof over-lap one another by a small amount. Wire leads 116 and 118, each covered with a Teflon or other suitable insulator 120, are connected to the leads 116 and 118, respectively, and extend therefrom to pins 122 which extend from a standard high temperature type connector assembly 124. The connector assembly 124 must be able to withstand temperature ranges from −65° F. to +500° F. The pin 122 end of the connector assembly 130 is mounted within the chamber 15. This is accomplished by extending the body 126 of the assembly 124 through an opening 128 formed in the body 13. A flange 130 is formed on the body 126 and fastened against a face 132 machined on the body 13 adjacent the opening 128. The fastening may be accomplished by any suitable means, such as screws 134. Wire leads 136 and 138 connect the external ends 140 of the pins 122 to a light 142, or other type signalling device, and a source of electrical power, such as a battery 144.

A modification which may be used in lieu of the magnet 102 and the reed switch assembly 106 is illustrated in FIGURE 4. The button assembly 20 includes a section of ferromagnetic material 150 inserted in its outer end and a contact 152 secured to the outer periphery thereof. A magnet 154 may be mounted in a lug 156, the lug 156 being secured to the wall 100 of the body 13. A second contact 158 is also fixedly secured to the wall 100. Wire leads 116 and 118 extend from the contacts 152 and 158, respectively, and connect with the pins 122 (FIGURE 1). It is apparent that elements 150 and 154 may be reversed, or that they may both comprise magnets.

*Operation*

So long as the filter element 50 is clean, the pressures entering the annulus 44 and the chamber 42 will be substantially equal and the magnetic piston assembly 38 will be retained against the concave side of the wall 18 by the spring 58. While the assembly 38 is in this position, the signal button assembly 20 will be retained against the convex side of the wall 18 due to the magnetic attraction of the armature portion 22 thereof by the magnet 82. This is the normal condition of device 10 when the filter is clean and the button assembly 20 has been reset.

It should be noted that the size and weight limitations on the device 10 result in the magnet assembly 38 being designed, insofar as its magnetic field is concerned, so that its operation is in no way effected by the relatively remote magnets 102 and 154, which serve a separate and distinct function. Magnets 102 and 154 are positioned beyond the useful or effective magnetic field of magnet assembly 38, and vice versa; this being so, they may, in fact, be oriented so that they theoretically repel magnet assembly 38. In summary, magnets 102 and 154 are merely associated with the signal button assembly 20, to serve a function other than one related to the differential pressure at which the assembly 20 will be moved to an indicating position. Obviously, the magnet 102 of FIGURE 1 could be attached to the signal button assembly 20 of FIGURE 4, if desired, and the switch assembly 106 used in lieu of the contacts.

When the filter element 50 becomes sufficiently clogged with foreign material to drop the downstream pressure in the conduit 68 and in the chambers 62 and 42 to a predetermined value below the upstream pressure, the resulting pressure differential will be applied across the magnetic piston assembly 38, causing it to move away from the wall 18 against the force of the spring 58. Since the magnetic force induced in the ferro-magnetic armature 22 is proportional to the reciprocal of the square of its distance from the magnet 82, once this induced force becomes less than the force of the spring 30, the signal button assembly 20 will be propelled to its dotted line position B until the flange 28 abuts against a wall of the chamber 14. The signal button 24 will thus remain extended and cannot be reset, even though it is manually depressed, until corrective action or some positive step is performed, as will be explained below.

As just indicated, once the pressure differential across the magnet assembly 38 reaches the predetermined value, the assembly 38 will be moved to the left against the force of the spring 58. The rate of the spring 58 is designed so that the distance of magnet travel multiplied by the spring rate produces a spring force increase less than the original magnetic force between the magnet assembly 38 and armature 22. Therefore, as soon as a separation occurs the magnet assembly 38 will snap completely to a stop position against the armature 56. The increasing magnetic attraction between the magnet assembly 38 and the armature 56 also assists this snap action.

Once the magnet assembly 38 contacts the ferro-magnetic element 56, it will remain in that position even after the pressure differential across the assembly 38 has subsided. In other words, the assembly will not automatically return to the wall 18, and the signal button 24 cannot be reset.

Movement of the signal button assembly 20 to the dotted line position B will have moved the center portion of the magnet 102 to a position substantially opposite the over-lapped ends of the blades 112 and 114. It is only in this position, that the field represented by the lines C will be effective in attracting the two blades 112 and 114 together. Once contact is made between the blades 112 and 114, the electrical circuit is completed via the internal wire leads 116 and 118, the pins 122 and 140, and the external wire leads 136 and 138 to energize the light bulb or other signalling device 142.

When one observes that the bulb 142 is lighted or that the button 24 has extended through the opening 34 to the position B, it is immediately apparent that the filter element 50 has become clogged and is in need of being changed.

In order to reset the button 24 in its normal position against the wall 18, it is necessary to force the rod 70 to the right against the force of the spring 78. This will move the magnet assembly 38 away from the element 56 and allow the spring 58 to return the assembly 38 to the wall 18. The rod 70 will be returned to its original position by the spring 78. It is only at this time that the signal button 24, when depressed, will again remain against the wall 18 by virtue of the attractive force of the magnet assembly 38. The necessity of gaining access to the rod 70 reasonably assures investigation or corrective action, such as the replacement of the expended filter 50.

When the visual warning unit 10 includes the modified structure of FIGURE 4, movement of the button assembly 20 toward the right, under the force of the spring 30, will cause the ferromagnetic element 150 to be attracted toward the magnet 154. Also, the movable contact 152 will abut against the fixed contact 158 and thereby complete the circuit through the lines 116 and 118, to energize the signal 142, as described above. The magnet 154 serves to retain the button assembly in its extreme rightward position, regardless of G loading, until such time as the filter 50 has been changed, the magnet assembly 38 reset against one side of the dome-shaped wall 18 and the button assembly 20 reset against the other side thereof.

From the above discussion, it is apparent that the invention provides a differential pressure indicator which is of a simple design that is easy to manufacture. Due to the small compact size, the thin, dome-shaped wall and the magnet designs, a relatively inexpensive and light-weight magnet assembly, armature and associated electrical switch assembly may be employed.

It should also be apparent that the invention provides a novel magnetic type actuator and electrical switch combination which will energize a suitable signal once the filter becomes clogged and will continue energizing the signal until the actuator has been manually reset.

While but one embodiment of the invention has been disclosed and described, it is apparent that other modifications thereof are possible within the scope of the appended claims.

What we claim as our invention is:

1. An electrical signal device, comprising a body having first, second and third chambers formed therein, a magnetic piston assembly forming a movable wall between said first and second chambers, a dome-shaped fixed wall between said second and third chambers, a magnet and an electrical contact fixedly secured adjacent said third chamber, an armature assembly slidably mounted in said third chamber, said armature assembly having a ferromagnetic member located at each of the ends thereof and a second electrical contact secured to the outer periphery thereof, one of said ferromagnetic ends normally being held against said dome-shaped wall by said magnetic piston until such time as the pressure differential across said magnetic piston moves said magnetic piston into said first chamber and away from said dome-shaped wall, and resilient means located in said third chamber for moving said armature assembly away from said dome-shaped wall and toward said fixed magnet when said magnetic piston moves away from said dome-shaped wall.

2. A differential pressure indicating device, comprising a source of pressure, a filter type variable restriction downstream of said source, a housing having first, second and third chambers formed therein, first magnetic means forming a movable wall between said first and second chambers, a fixed dome-shaped wall formed between said second and third chambers, first resilient means in said first chamber urging said first magnetic means into said second chamber and against said fixed wall, an armature assembly slidably mounted in said third chamber and retained against one side of said fixed wall when said first magnetic means is in contact with the other side of said fixed wall, second resilient means located in said third chamber urging said armature assembly away from said fixed wall when the pressure differential across said first magnetic means moves said first magnetic means away from said fixed wall, and second magnetic means for retaining said armature assembly a constant distance away from said fixed wall regardless of G loading effects thereon until said first magnetic means and said armature assembly are reset against said fixed wall.

3. A pressure differential responsive electrical signal device, comprising a body having at least three chambers formed therein, magnetic means forming a movable wall between the first and second of said three chambers, a fixed dome-shaped wall separating said second and third chambers, means for communicating a pressure differential across said movable wall, an armature assembly slidably mounted in said third chamber, said armature assembly including ferro-magnetic material at both ends thereof and a first electrical switch contact secured to a side thereof, second magnetic means adjacent one of said ferro-magnetic ends, a second switch contact fixedly secured to said body adjacent said second magnetic means, and resilient means for at times projecting said armature assembly and said first contact away from said fixed wall and toward said second magnetic means and said second contact.

4. A pressure differential responsive electrical signal device, comprising a non-magnetic body having at least three chambers formed therein, magnetic means forming a movable wall between the first and second of said three chambers, a fixed dome-shaped wall separating said second and third chambers, means for communicating a pressure differential across said movable wall, an armature assembly slidably mounted in said third chamber, said armature assembly including ferro-magnetic material at both ends thereof and a first electrical switch contact secured to a side thereof, a second switch contact fixedly secured to said body adjacent said third chamber, second magnetic means adjacent one of said ferro-magnetic ends, and resilient means for at times projecting said armature assembly away from said fixed wall between said second and third chambers, thereby bringing said first contact into engagement with said second contact, said second magnetic means serving to maintain continuous engagement between said first and second contacts in opposition to external forces on said armature assembly tending to separate the same.

5. A pressure responsive electrical signal device, comprising a non-magnetic body having at least three chambers formed therein, magnetic means forming a movable wall between the first and second of said three chambers, a fixed dome-shaped wall formed between the second and third chambers, said second chamber having a fluid inlet and being sealed to retain a fluid under pressure, an armature assembly slidably mounted in the third of said three chambers, a magnet and first contact fixedly secured to said body adjacent said third chamber, a second contact fixedly secured to said armature assembly, and resilient means for at times projecting said armature assembly and said second contact away from said dome-shaped wall and toward said magnet and said first contact, respectively.

6. A pressure responsive electrical signal device, comprising a body having at least three chambers formed therein, a pressure responsive movable wall element between the first and second of said three chambers, a fixed dome-shaped wall formed between said second and third chambers, said second chamber having a pressure inlet and being sealed to retain a fluid pressure therein, an indicator element slidably mounted in said third chamber, one of said movable wall and said indicator elements including a magnet and the other including an armature attracted by said magnet, the magnet and armature ends of said movable wall and said indicator elements being adjacent said dome-shaped wall and having mating domed-surfaces, first resilient means in said first chamber biasing said movable wall into engagement with said dome-shaped wall, second resilient means for projecting said indicator element away from said dome-shaped wall when said movable wall is moved away from said fixed wall by an increased pressure a sufficient distance to cause said second resilient means to overcome said magnetic attraction, and an electrical switch operated by said indicator element when moved away from said dome-shaped wall.

7. A signal device such as that recited in claim 6, wherein a second magnet is fixedly secured to said indicator element and said switch comprises a reed switch fixedly secured to said body adjacent said third chamber, said reed switch being closed by said second magnet when said indicator element is projected away from said domed wall by said second resilient means.

References Cited
UNITED STATES PATENTS

| | | | |
|---|---|---|---|
| 2,262,495 | 11/1941 | Hausler | 200—67 |
| 3,077,854 | 2/1963 | Pall | 116—70 |
| 3,140,690 | 7/1964 | Siebel | 116—70 |

BERNARD A. GILHEANY, *Primary Examiner.*

H. BROOME, *Assistant Examiner.*